No. 796,877. PATENTED AUG. 8, 1905.
C. H. SOUTHARD.
MACHINE FOR MAKING CHEESE.
APPLICATION FILED AUG. 15, 1904.
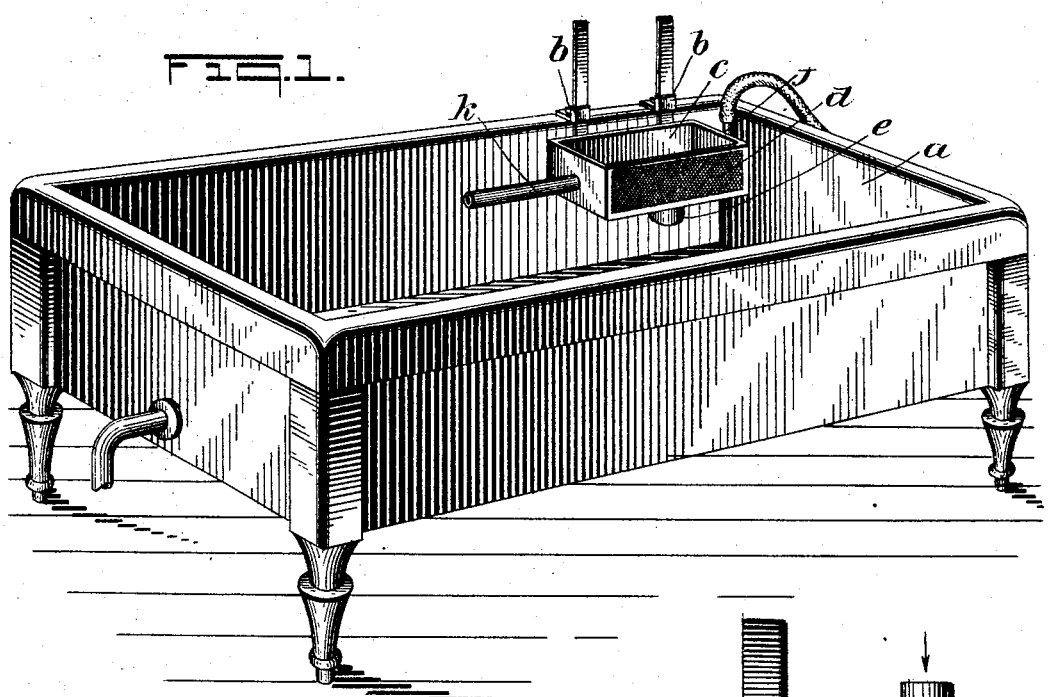
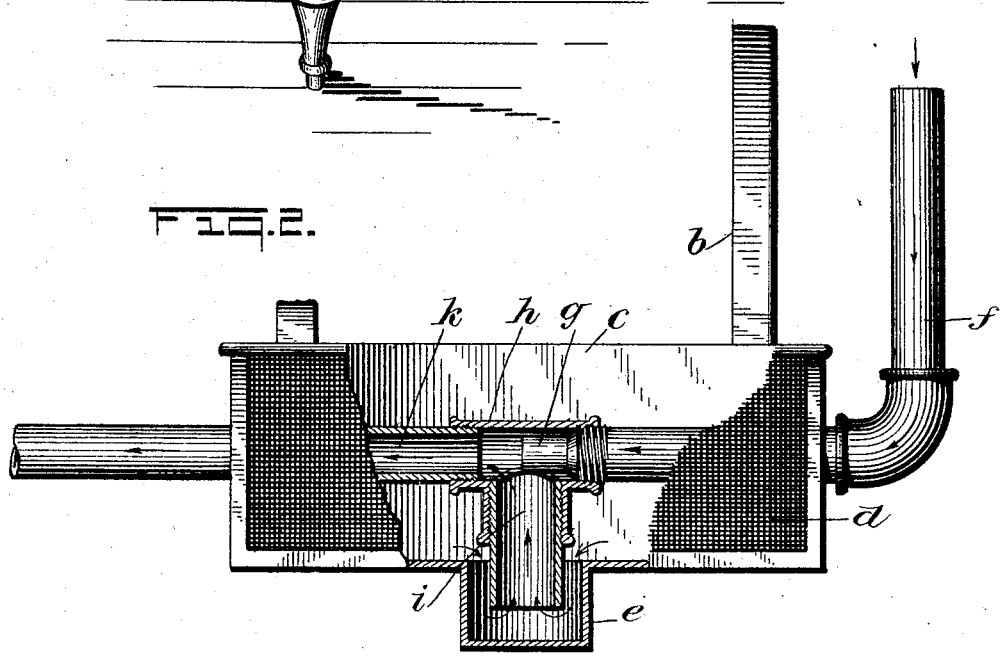
WITNESSES:
INVENTOR
Charles H. Southard
BY
ATTORNEYS

UNITED STATES PATENT OFFICE.

CHARLES HENRY SOUTHARD, OF SMITHVILLE FLATS, NEW YORK.

MACHINE FOR MAKING CHEESE.

No. 796,877.     Specification of Letters Patent.     Patented Aug. 8, 1905.

Application filed August 15, 1904. Serial No. 220,775.

*To all whom it may concern:*

Be it known that I, CHARLES HENRY SOUTHARD, a citizen of the United States, and a resident of Smithville Flats, in the county of Chenango and State of New York, have invented a new and Improved Machine for Making Cheese, of which the following is a full, clear, and exact description.

The invention relates to a means for heating and circulating the material in cheese-vats; and it consists, briefly stated, in the novel mechanism for performing this operation, in which mechanism an ejector is provided with a suction-port adapted to draw the whey therethrough, so that the steam passing through the ejector-nozzle will carry with it a quantity of whey, and the two will be admixed and discharged into the vat.

Reference is had to the accompanying drawings, which form a part of this specification, in which drawings like characters of reference indicate like parts in both views, and in which—

Figure 1 is a perspective view showing the invention in use; and Fig. 2 is an enlarged view with parts in section, showing the ejector and strainer in connection with which it is used.

$a$ indicates the cheese-vat, which may be of the usual or any construction. Mounted within the vat, preferably by means of arms and clamps $b$, is a box $c$, having one or more of its walls provided with a strainer-sieve $d$, so that this box when partly submerged in the contents of the tank will be filled with whey to the level at which the box is submerged, the whey running in through the screen or strainer $d$. The box $c$ is provided in its bottom with a cup $e$, in which the whey will collect. Passing into the box is a steam-pipe $f$, which in operation is connected with any suitable source of steam. Said pipe terminates in an ejector-nozzle $g$, located in an ejector-casing $h$, the suction-pipe $i$ of which dips into the cup $e$. The outlet of the ejector discharges into a nozzle-pipe $k$, which passes through the box and discharges into the vat $a$, as shown in Fig. 1.

In the operation of the invention, the steam being turned into the ejector will pass through the same, drawing the whey into the nozzle $g$, where it is mixed with the steam, and this mixture is discharged in a strong current through the nozzle-pipe $k$ into the vat, causing its contents to be heated and at the same time creating a circulating current which thoroughly agitates the material in the vat. The whey will constantly run into the box through the screen $d$, and with a constant supply of steam the operation may be carried on as long as desired. By mixing the whey with the steam the force of the steam is reduced, and I have avoided destroying the soft curd, which destruction would result from the employment of pure live steam.

Various changes in the form, proportions, and minor details of my invention may be resorted to at will without departing from the spirit and scope thereof. Hence I consider myself entitled to all such variations as may lie within the terms of my claims.

Having thus described my invention, I claim as new and desire to secure by Letters Patent—

1. A cheese-vat, and means for forcing a mixture of steam and whey into the vat to heat the contents thereof.

2. A cheese-vat and means for forcing a mixture of steam and whey into the vat to heat the contents thereof, the said means comprising a steam-ejector device having its suction-pipe extending into the contents of the vat, whereby the whey of said mixture is drawn from the vat.

3. A heating device for cheese-vats, comprising a box having an opening covered by a screen or strainer, and an ejector having its suction-port in communication with the box to withdraw the contents thereof.

4. A heating device for cheese-vats, comprising a box having an opening covered by a screen or strainer, and having a cup in the bottom of the box, and an ejector having a suction-pipe projected into said cup.

5. The combination with a cheese-vat, of a heating device comprising a box mounted within the vat and constructed to receive whey from the vat, a cup in the bottom of the box into which the whey collects, a steam-pipe passing into the box and terminating in an ejector-nozzle, an ejector-casing in which the said nozzle is located, the said casing having a suction-pipe extending into the said cup, and an outlet-pipe leading from the ejector-casing and discharging into the vat.

In testimony whereof I have signed my name to this specification in the presence of two subscribing witnesses.

CHARLES HENRY SOUTHARD.

Witnesses:
 HERMON V. HOAG,
 NATHAN E. DAVIS.